United States Patent [19]

Tomalin

[11] Patent Number: 4,717,804
[45] Date of Patent: Jan. 5, 1988

[54] EDM WIRE ELECTRODE

[75] Inventor: D. S. Tomalin, Chagrin Falls, Ohio

[73] Assignee: General Electric Company, Schenectady, N.Y.

[21] Appl. No.: 888,680

[22] Filed: Jul. 24, 1986

[51] Int. Cl.⁴ .......................... B23H 1/06; B23H 7/08
[52] U.S. Cl. ................... 219/69 W; 219/69 E
[58] Field of Search .................. 219/69 E, 146.1; 428/244, 457

[56] References Cited

U.S. PATENT DOCUMENTS

| 2,526,423 | 10/1950 | Rudorff | 219/69 W |
| 2,906,853 | 9/1959 | Sibley | 219/69 W |
| 3,600,981 | 8/1971 | Wagner | 219/69 W |
| 4,287,404 | 9/1981 | Convers et al. | 219/69 W |
| 4,341,939 | 7/1982 | Briffod et al. | 219/69 E |
| 4,392,042 | 7/1983 | Inoue | 219/69 W |
| 4,422,918 | 12/1983 | Inoue | 219/69 W |
| 4,686,153 | 8/1987 | Tominaga et al. | 219/69 W |

FOREIGN PATENT DOCUMENTS

| 53-22930 | 7/1978 | Japan | 219/146.1 |
| 58-94925 | 6/1983 | Japan | 219/69 W |
| 155127 | 9/1983 | Japan | 219/69 E |
| 60-67026 | 4/1985 | Japan | 219/69 E |
| 645831 | 10/1984 | Switzerland | 219/69 W |
| 1408801 | 10/1975 | United Kingdom | 219/69 E |
| 1060383 | 12/1983 | U.S.S.R. | |

*Primary Examiner*—A. D. Pellinen
*Assistant Examiner*—Geoffrey S. Evans
*Attorney, Agent, or Firm*—Philip L. Schlamp; J. F. McDevitt; Edward M. Corcoran

[57] ABSTRACT

An improved electrical discharge machining electrode permitting increased cutting speed of the metal workpiece being machined and which improves the operation of the electrical discharge machining equipment in other respects. The improvement is atrributable to an adherent carbon surface coating deposited on an electrically conductive metal wire length which serves to transfer energy efficiently to the workpiece from the spark discharge as well as enhance the flushing of materials removed by said discharge during the machining operation. The method and apparatus for employment of said improved electrode is also described.

10 Claims, 4 Drawing Figures

EDM WIRE ELECTRODE

BACKGROUND OF THE INVENTION

A known wire electrode member and apparatus for electrical discharge machining is described in U.S. Pat. No. 4,287,404 wherein the electrically conductive metal wire is provided with an active surface comprising at least 50 percent by weight of a metal or alloy selected from a group consisting of zinc, cadmium, tin, lead, antimony and bismuth. In the preferred apparatus, said active surface coating is provided by electrolytic plating on the exterior surface of a conventional metal wire in a continuous manner during the machining operation. Such continuous replenishment of the active surface while the workpiece is being machined understandably renders the equipment more complex to build and operate. Cutting speeds for said prior art wire electrode member is said to be optimum when the core metal is copper or brass since a steel core member is said to require coating with copper or silver for improved electrical conductance. Accordingly, desirable mechanical strength for this electrode member is obtained at some sacrifice in the electrical conductance unless added costs are incurred with utilization of the disclosed higher conductivity inner layer. A low vaporization temperature for the active surface coating on said prior art electrode member is also said to be needed in order to avoid rupturing said electrode member in the machining zone.

It remains desirable, therefore, to overcome the above mentioned drawbacks with an electrode member suitable for electrical discharge machining as well as increase the cutting speeds in said type machining operation.

A further desirable objective is to simplify the process and equipment needed to carry out electrical discharge machining insofar as attributable to the wire electrode member being utilized.

These and other objectives of the present invention will be apparent from the following detailed description.

SUMMARY OF THE INVENTION

It is now been found, surprisingly, that a particular active surface coating of carbon improves the cutting speeds of electrical discharge machining especially at smaller diameters of the wire electrode member thereby enabling a more precise machining operation to be carried out. In the latter respect, the surface finish of a machined metal object can also be improved since higher cutting speeds are customarily utilized with larger diameter wire electrode members. Accordingly, a carbon coating as thin as 1.0 micron and which is adherently bonded to the surface of an electrically conductive metal wire length provides this improvement when coated on a variety of metal containing substrates. A particularly useful metal containing substrate for the desired adherent carbon coating consists of an oxide surface formed on the metal or metal alloy wire core by various known techniques. For example, the "black" tungsten or molybdenum wire which is obtained by drawing such wire through dies, as described in the text "Tungsten" by C. J. Smithells, Chapman and Hall (1952), provides a preferred wire electrode member according to the present invention. The composite electrode member obtained in this manner will consist of a refractory metal core exhibiting both a relatively high mechanical strength and a relatively high melting point, a metal containing inner layer of the selected refractory metal oxide exhibiting a lower melting point being bonded to the metal substrate, and a discontinuous surface coating of graphite which is bonded to the porous oxide inner layer.

A different preferred wire electrode member according to the present invention utilizes a modified form of ferrous alloy metal core wire, such as Dumet or Cumet, both commercial products of General Electric Company, and which have had the copper clad surfaces oxidized for adherent bonding of the active carbon surface layer thereto. A wire electrode member of this type having representive 0.004–0.010 diameter can be prepared by thermally oxidizing the copper clad wire by conventional means, thereafter coating the oxidized wire with a carbon lubricant surface coating, and finally reducing the diameter of said carbon coated wire with dies in the same manner as above described for black refractory metal wire except that said wire drawing is carried out at ordinary ambient temperatures. A still different means contemplated is secure the adherent carbon surface coating to an electrically conductive metal containing substrate in accordance with the present invention consists of known chemical vapor deposition techniques whereby the metal substrate is first coated with carbon and thereafter reduced in diameter as previously described.

Carrying out the electrical discharge machining process according to the present invention generally comprises moving the electrically charged wire electrode member in close proximity to a metal workpiece so as to cause a spark discharge therebetween, said wire electrode member comprising a conductive metal wire length having an adherent carbon surface coating, contacting the gap space between said workpiece surface and the moving wire electrode member with a moving dielectric liquid, removing metal from the workpiece and carbon from the wire electrode member with said spark discharge, and displacing the removed metal and carbon from the gap space in the moving dielectric fluid. In accordance with said modified process, a conventional EDM machine, such as the commercially available ELOX equipment, is supplied with a spool of the present wire electrode material for a single pass mode of operation. The surface graphite layer is volatilized during such operation with the volatilized by-products providing effective flushing of the gap space at high removal rates because of the intensive energy transfer taking place. When such mode of operation is conducted with a preferred black molybdenum wire electrode, constructed as above described, the once used wire can again be recoated with a replacement grapite coating for reuse in the machining operation. Thus, a reusable wire electrode member can be provided according to the present invention which has understandable cost advantages to the EDM equipment manufacturers and users. The presently improved wire electrode member provides still further advantages in the operation of already commercial EDM equipment. More particularly, said wire electrode member is generally transported in said equipment by use of guide means, such as rollers, pulleys and the like, and which further serve to position said electrode member at the working or gap space location. A pair of said guide members are generally oriented vertically or horizontally at said location with the workpiece being located therebetween for longitudinal or lateral machining, respectively, and the moving prior art electrode members having been observed to vibrate in said gap space disturbing the desired machining step. A greater rigidity imparted by the aforemention black molybednum wire electrode member of the present invention reduces such vibration especially when the machining takes place along a diagonal direction wherein said spaced apart guide members are laterally displaced with respect to each other. Moreover, greater lubricity is provided by the present carbon surface coating thereby reducing friction in the EDM equipment which is a further advantage.

DESCRIPTION OF THE PREFERRED EMBODIMENTS

Figure 1:
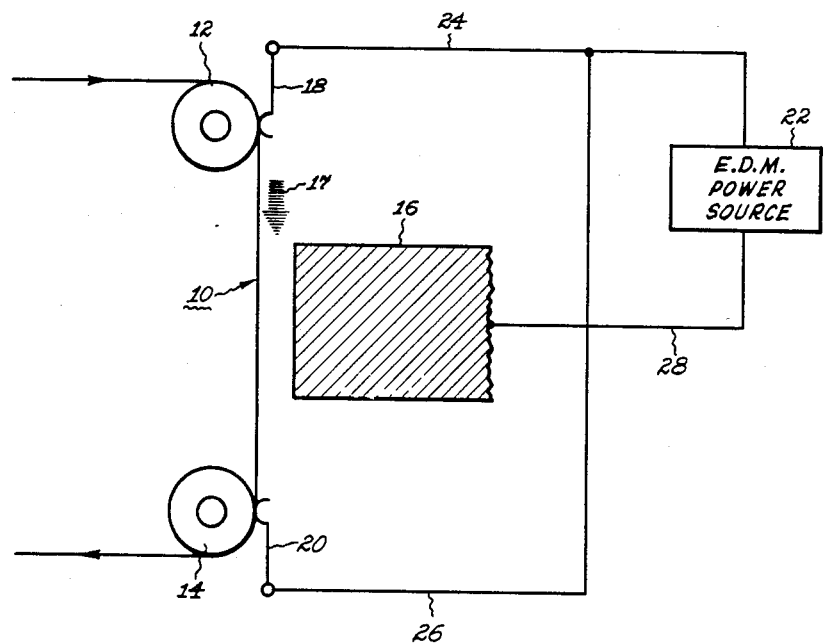
FIG. 1 is a schematic view depicting the major component parts of an improved EDM apparatus accordng to the present invention.

In FIG. 1 there is shown a fragmentary view depicting the present wire electrode member 10 while being used in the operation of anotherwise conventional EDM machine. Said wire electrode member 10 is suspended between a pair of guide rollers 12 and 14 to travel downwardly in a vertical direction and produce a spark discharge (not shown) causing the machining step to take place. The metal workpiece 16 being machined in said manner is positioned in close proximity to said moving electrode wire member at a distance producing the spark discharge therebetween when said wire electrode member and workpiece are properly interconnected in a conventional EDM electrical circuit. More particularly, said electrical circuit employs a pair of brush contacts 18 and 20 to contact said electrode member and which are suitably further connected by conductors 24 and 26, respectively, to a conventional EDM power source 22. Electrical connection of said EDM power source by a further conductor 28 completes the required electrical circuit. A supply of moving dielectric fluid 17 such as deionized water is also provided at the gap space location to remove the metal particulates caused by action of the spark discharge on the workpiece along with the carbon particulates being volatilized from the present wire electrode member during such use.

A comparison is provided in the following Table for cutting speeds measured with prior art brass and molybdenum wire electrodes as compared with the presently improved carbon coated electrode members. In said comparison test, the workpiece consisted of a one inch thick hardened tool steel plate being machined in the above described manner with a commercial ELOX machine and which utilized wire electrode members having a diameter as listed in said Table. Voltage and current measurements are also reported in said Table for the various electrode members during use which serve to indicate that excessive electrical power utilization does not occur with the present improvement.

TABLE

| Type Electrode (material-dia.) | Cutting Speed (in²/hr) | Gap Voltage (volts) | Gap Current (amperes) |
| --- | --- | --- | --- |
| brass - .006 in. | 5.4 | 50 | 3.0 |
| molybdenum (bare) - .006 in. | 3.6 | 50 | — |
| molybdenum (black) - .006 in. | 4.8 | 50 | — |
| Dumet (graphite coated) - .006 in. | 3.3 | 50 | 3.0 |
| brass - .004 in. | 3.9 | 50 | 3.0 |
| molybdenum (bare) - .004 in. | 3.0 | 50 | 3.0 |
| molybdenum (black) - .004 in. | 4.2 | 45 | 3.5 |
| molybdenum (black) - .004 in. | 4.0 | 45 | 3.4 |

The above Table results clearly evidence the superiority in cutting speeds for a preferred black molybdenum electrode member of the present invention at the small wire diameter now employed for precise machining. Moreover, the 0.004 inch diameter brass electrode tested for comparison purposes also produced an unstable cutting result as further evidence of its lack of suitability at this wire diameter. On the other hand, the above demonstrated lower comparative cutting speeds for a carbon coated Dumet electrode member may simply illustrate a lack of sufficient graphite coating thickness having been deposited to achieve the desired improvement.

Figure 2:
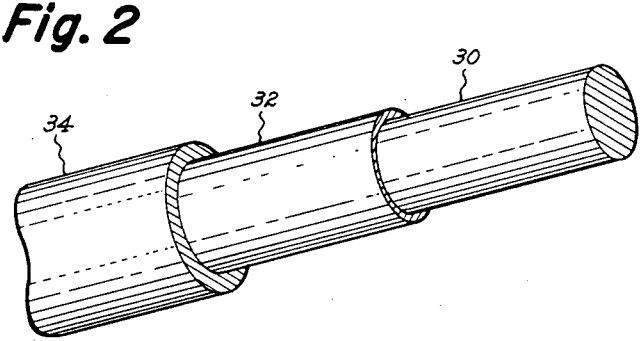
FIG. 2 is a perspective view for a preferred wire electrode member illustrating its three part composite construction.

In FIG. 2, there is shown in perspective the composite construction of a representative wire electrode member according to the present invention. Specifically, said wire electrode member 10 consists of an electrically conductive metal core 30, having particular oxidized inner layer 32 formed at its surface which can serve to provide a metallurgical bond for the surface carbon coating 34 deposited thereon. The particular copper oxide found useful in this manner is cuprous oxide which is an electrically semiconductive material after determining that electrically insulative cupric oxide does not serve as an effective bonding medium for the carbon surface layer when the wire electrode member is in use. While such a metallurgical bond is not being critical to achieving the improved metal removal mechanism according to the present invention such a bond should serve to enhance the mechanical integrity of the present composite electrode member and possibly further enhance the deposition thereon of carbon surface coatings having increased thickness for still more rapid metal removal from the workpiece. In this regard, the oxidation of a copper clad Dumet or Cumet wire to form a porous oxide surface deposit to which is adherently bonded a graphite coating has improved cutting speeds in the above described test procedure by at least 20 percent.

Figure 3:
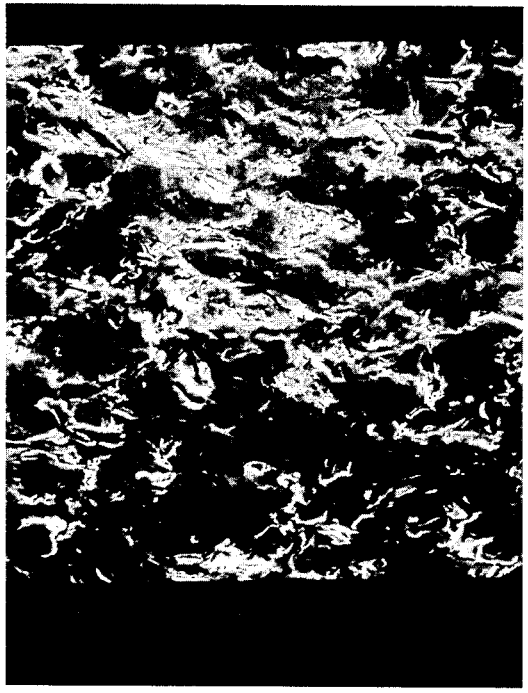
FIG. 3 is a photomicrograph depicting the condition of a machined workpiece surface as produced with a brass wire electrode member.
Figure 4:
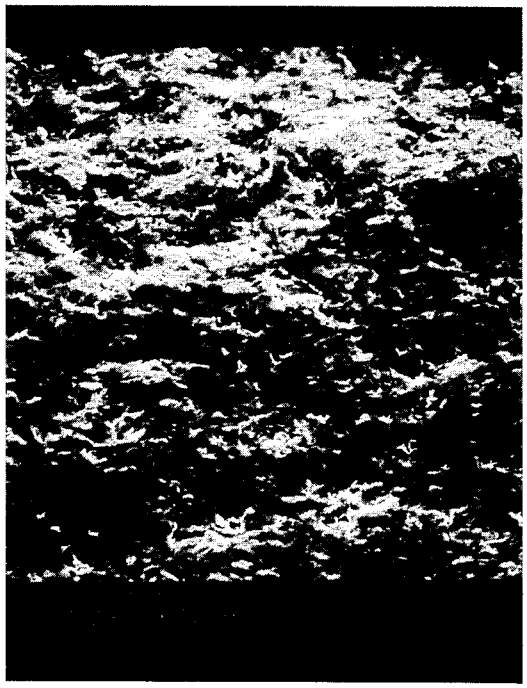
FIG. 4 is a photomicrograph for said workpiece surface when machined with the presently improved wire electrode member.

FIGS. 3-4 photomicrographs represent SEM views of the above described machined steel rod surface at 500× magnification. The FIG. 3 view illustrates the work surface obtained with a 0.004 inch diameter brass wire electrode member whereas FIG. 4 is the same view obtained upon machining said workpiece with a 0.004 inch diameter black molybdenum wire electrode member of the present invention. A much smoother surface finish in FIG. 4 as compared with FIG. 3 evidences still another benefit attributable to the present invention. A still different benefit to users of the improved EDM apparatus is an ability found to machine steel workpieces to a much greater depth with said black molybdenum electrode member than was found possible with said brass electrode member without risking mechanical breakage of the electrode member. In said latter regard, the penetration depth achieved with said molybdenum electrode member was at least twice that achieved with the brass electrode member.

It will be apparent from the foregoing description that a generally useful electrical discharge machining electrode has been provided along with modifications to the otherwise conventional process and apparatus for its use. It will be apparent to those skilled in the art, however, that compositional variations can be made in the core metals as well as any intermediate layers deposited thereon for the purpose of satisfactorily adhering the carbon surface coating thereto than above specifically disclosed without departing from the spirit and scope of the present invention. For example, it is contemplated that said intermediate bonding layers can be formed with still other low melting point metals and non-metals which also exhibit relatively high vapor pressures when heated by the spark discharge in providing a suitable bonding and carrier substrate for the active carbon surface of said electrode member. Accordingly, it is intended to limit the scope of the present invention only by the scope of the following claims:

I claim:

1. An electrical discharge machining electrode which comprises a composite member having an electrically conductive entirely metal wire length of ferrous alloy metal for its core and with said core being clad with a layer of copper whose outer surface is oxidized and coated with graphite.

2. The electrode of claim 1 wherein said oxidized outer surface of said copper comprises cuprous oxide.

3. An electrical discharge machining electrode which comprises a composite member having an electrically conductive entirely metal wire exhibiting both a relatively high mechanical strength and a relatively high melting point for its core, a metal containing innerlayer exhibiting a lower melting point bonded to the metal core whose outer surface is oxidized, and an adherent preformed solid carbon surface coating bonded to said oxidized surface of said inner layer.

4. An electrical discharge machining process which comprises moving an electrically charged wire electrode member in close proximity to a metal workpiece so as to cause a spark discharge therebetween, said wire electrode member having a composite construction comprising an electrically conductive entirely metal wire length exhibiting both a relatively high mechanical strength and a relatively high melting point for its core, a metal innerlayer exhibiting a lower melting point bonded to said metal core whose outer surface is oxidized and an adherent preformed solid carbon surface deposit or coating bonded to said oxidized surface of said inner layer, contacting the gap space between said workpiece surface and the moving wire electrode member with a moving dielectric liquid, removing metal from the workpiece and carbon from the wire electrode member with said spark discharge, and displacing the removed metal and carbon from the gap space in the moving dielectric fluid.

5. A process as in claim 4 wherein said surface carbon coating is graphite.

6. A process as in claim 5 wherein the spark discharge causes removal of both carbon and some innerlayer by volatilization.

7. An electrical discharge machining process which comprises moving an electrically charged wire electrode member in close proximity to a metal workpiece so as to cause a spark discharge therebetween, said wire electrode member comprising a composite member having an electrically conductive entirely metal wire length of ferrous alloy metal for its core and with said core being clad with a layer of copper whose outer surface is oxidized and coated with graphite, contacting the space between said workpiece surface and the moving wire electrode member with a moving dielectric liquid, removing metal from the workpiece and carbon from the wire electrode member with said spark discharge, and displacing the removed metal end carbon from the gap space with the moving dielectric fluid.

8. The process of claim 7 wherein said oxide coating on said copper layer comprises cuprous oxide.

9. An electrical discharge machining process which comprises moving an electrically charged wire electrode member in close proximity to a metal workpiece so as to cause a spark discharge therebetween, said wire electrode member comprising a wire having molybdenum or alloy thereof for its core, said molybdenum core containing an adherent coating of molybdenum oxide which, in turn, is coated with a preformed coating of carbon, contacting the space between said workpiece surface and the moving wire electrode member with a moving dielectric liquid, removing metal from the workpiece and carbon from the wire electrode member with said spark discharge, and displacing the removed metal end carbon from the gap space with the moving dielectric fluid.

10. The process of claim 9 wherein said carbon coating comprises graphite.

* * * * *